United States Patent
Vandermeijden

(10) Patent No.: US 9,946,391 B2
(45) Date of Patent: Apr. 17, 2018

(54) SENSING OBJECTS USING MULTIPLE TRANSMITTER FREQUENCIES

(71) Applicant: Synaptics Incorporated, San Jose, CA (US)

(72) Inventor: Tom R. Vandermeijden, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/752,666

(22) Filed: Jun. 26, 2015

(65) Prior Publication Data
US 2016/0179271 A1    Jun. 23, 2016

Related U.S. Application Data

(63) Continuation-in-part of application No. 14/675,622, filed on Mar. 31, 2015.

(60) Provisional application No. 62/120,859, filed on Feb. 25, 2015, provisional application No. 62/085,135, filed on Nov. 26, 2014.

(51) Int. Cl.
*G06F 3/041* (2006.01)
*G06F 3/044* (2006.01)
*G06F 3/0354* (2013.01)

(52) U.S. Cl.
CPC ........ *G06F 3/0416* (2013.01); *G06F 3/03545* (2013.01); *G06F 3/044* (2013.01); *G06F 2203/04106* (2013.01)

(58) Field of Classification Search
CPC .... G06F 3/0416; G06F 3/03545; G06F 3/044; G06F 2203/04106
See application file for complete search history.

(56) References Cited

U.S. PATENT DOCUMENTS 5,023,408 A    6/1991  Murakami et al.
5,294,792 A    3/1994  Lewis et al.
(Continued)

FOREIGN PATENT DOCUMENTS

WO    2014128712 A1    8/2014

OTHER PUBLICATIONS

Final Office Action dated Apr. 14, 2017, U.S. Appl. No. 14/675,622 (40 pages).
(Continued)

*Primary Examiner* — Patrick Edouard
*Assistant Examiner* — Joseph Fox
(74) *Attorney, Agent, or Firm* — FBFK PC

(57) ABSTRACT

A processing system includes a sensor module coupled to sensor electrodes. The sensor module is configured to drive the sensor electrodes with first sensing signals and with second sensing signals at a second frequency. The processing system further includes a determination module configured to obtain, concurrently with the driving of the sensor electrodes, first measurement values that are based on effects of the first sensing signals, and a resonance of a pen in a sensing region. Concurrently with the driving of the sensor electrodes, second measurement values are obtained that are based on effects of the second sensing signals, and the resonance of the pen in the sensing region. The determination module determines a resonating state of the pen based on the first measurement values and the second measurement values, and reports the resonating state of the pen.

13 Claims, 4 Drawing Sheets

(56) References Cited

U.S. PATENT DOCUMENTS

| | | |
|---|---|---|
| 6,249,234 B1 | 6/2001 | Ely et al. |
| 6,641,044 B2 | 11/2003 | Plesko |
| 7,406,393 B2 | 7/2008 | Ely et al. |
| 8,773,404 B2 | 7/2014 | Wei et al. |
| 2009/0251434 A1 | 10/2009 | Rimon et al. |
| 2011/0122087 A1 | 5/2011 | Jang et al. |
| 2011/0169756 A1 | 7/2011 | Ogawa et al. |
| 2011/0205191 A1 | 8/2011 | Hou et al. |
| 2011/0267292 A1 | 11/2011 | Yeh |
| 2011/0291944 A1* | 12/2011 | Simmons ............... G06F 3/0416 345/173 |
| 2012/0038583 A1* | 2/2012 | Westhues ............... G06F 3/0412 345/174 |
| 2012/0068964 A1* | 3/2012 | Wright ................ G06F 3/03545 345/174 |
| 2012/0105361 A1 | 5/2012 | Kremin et al. |
| 2012/0242603 A1 | 9/2012 | Engelhardt et al. |
| 2012/0313865 A1 | 12/2012 | Pearce |
| 2012/0330590 A1* | 12/2012 | Bulea ..................... G06F 3/044 702/65 |
| 2013/0050144 A1* | 2/2013 | Reynolds ................ G06F 3/044 345/174 |
| 2013/0155015 A1 | 6/2013 | Chang |
| 2014/0104224 A1 | 4/2014 | Ih et al. |
| 2014/0132529 A1 | 5/2014 | Jeong |
| 2014/0160045 A1 | 6/2014 | Park et al. |
| 2014/0184245 A1 | 7/2014 | Hara et al. |
| 2014/0210781 A1 | 7/2014 | Stern |
| 2014/0240298 A1 | 8/2014 | Stern |
| 2015/0123923 A1 | 5/2015 | Stern |
| 2015/0153845 A1 | 6/2015 | Chang et al. |
| 2015/0199035 A1* | 7/2015 | Chang ................ G06F 3/03545 345/179 |
| 2015/0338933 A1 | 11/2015 | Holz et al. |
| 2016/0139732 A1 | 5/2016 | Takeda et al. |

OTHER PUBLICATIONS

Final Office Action dated Apr. 7, 2017, U.S. Appl. No. 14/752,681 (28 pages).

* cited by examiner

US 9,946,391 B2

SENSING OBJECTS USING MULTIPLE TRANSMITTER FREQUENCIES

CROSS-REFERENCE TO RELATED APPLICATIONS

This application claims priority under 35 U.S.C. § 119(e) to U.S. Provisional Patent Application Ser. No. 62/120,859, filed on Feb. 25, 2015, and entitled, "SENSING INPUT OBJECTS AT MULTIPLE FREQUENCIES", which is incorporated herein by reference in its entirety. This application further claims priority under 35 U.S.C. § 120 as a continuation-in part of U.S. patent application Ser. No. 14/675,622, filed on Mar. 31, 2015, and entitled "Pen With Inductor", which is incorporated herein by reference in its entirety. U.S. patent application Ser. No. 14/675,622 claims priority under 35 U.S.C. § 119(e) to U.S. Provisional Patent Application Ser. No. 62/085,135, filed on Nov. 26, 2014 and entitled, "Resonating Passive Pen", which is incorporated herein by reference in its entirety.

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a processing system that includes a sensor module coupled to sensor electrodes. The sensor module is configured to drive the sensor electrodes with first sensing signals at a first frequency, and drive the sensor electrodes with second sensing signals at a second frequency. The processing system further includes a determination module configured to obtain, concurrently with the driving of the sensor electrodes with the first sensing signals, first measurement values that are based on effects of the first sensing signals, and a resonance of a pen in a sensing region. Concurrently with the driving of the sensor electrodes with the second sensing signals, second measurement values are obtained that are based on effects of the second sensing signals, and the resonance of the pen in the sensing region. The determination module determines a resonating state of the pen based on the first measurement values and the second measurement values, and reports the resonating state of the pen.

In general, in one aspect, embodiments relate to a method for sensing input objects, including driving sensor electrodes with first sensing signals at a first frequency, and driving the sensor electrodes with second sensing signals at a second frequency. The method further includes obtaining, concurrently with the driving of the sensor electrodes with the first sensing signals, first measurement values that are based on effects of the first sensing signals, and a resonance of a pen in a sensing region, and obtaining, concurrently with the driving of the sensor electrodes with the second sensing signals, second measurement values that are based on effects of the second sensing signals, and the resonance of the pen in the sensing region. The method further includes determining a resonating state of the pen based on the first measurement values and the second measurement values, and reporting the resonating state of the pen.

In general, in one aspect, embodiments relate to a, input device including sensor electrodes configured to generate sensing signals, and a processing system connected to the sensor electrodes. The processing system is configured to drive the sensor electrodes with first sensing signals at a first frequency, drive the sensor electrodes with second sensing signals at a second frequency, obtain, concurrently with the driving of the sensor electrodes with the first sensing signals, first measurement values that are based on effects of the first sensing signals, and a resonance of a pen in a sensing region, and obtain, concurrently with the driving of the sensor electrodes with the second sensing signals, second measurement values that are based on effects of the second sensing signals, and the resonance of the pen in the sensing region. The processing system further determines a resonating state of the pen based on the first measurement values and the second measurement values, and reports the resonating state of the pen.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements. Further, in the figures, three co-linear dots indicate that additional items of similar type to the preceding and/or succeeding items with respect to the dots may optionally exist.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In at least some embodiments, a pen may include functionality to be in a resonating state or a non-resonating state. If in a resonating state, the pen may include functionality to resonate at one of different frequencies. In other words, the pen may include components to change the resonating frequency of the pen post manufacturing of the pen (e.g., during use by an end user). In a non-resonating state, the pen is not resonating. One or more embodiments are directed to an input device that includes functionality to determine the resonating state or non-resonating state of the pen and report the state accordingly. Further, if the pen is in the resonating state, the input device may include functionality to determine the resonating frequency of the pen.

Figure 1:
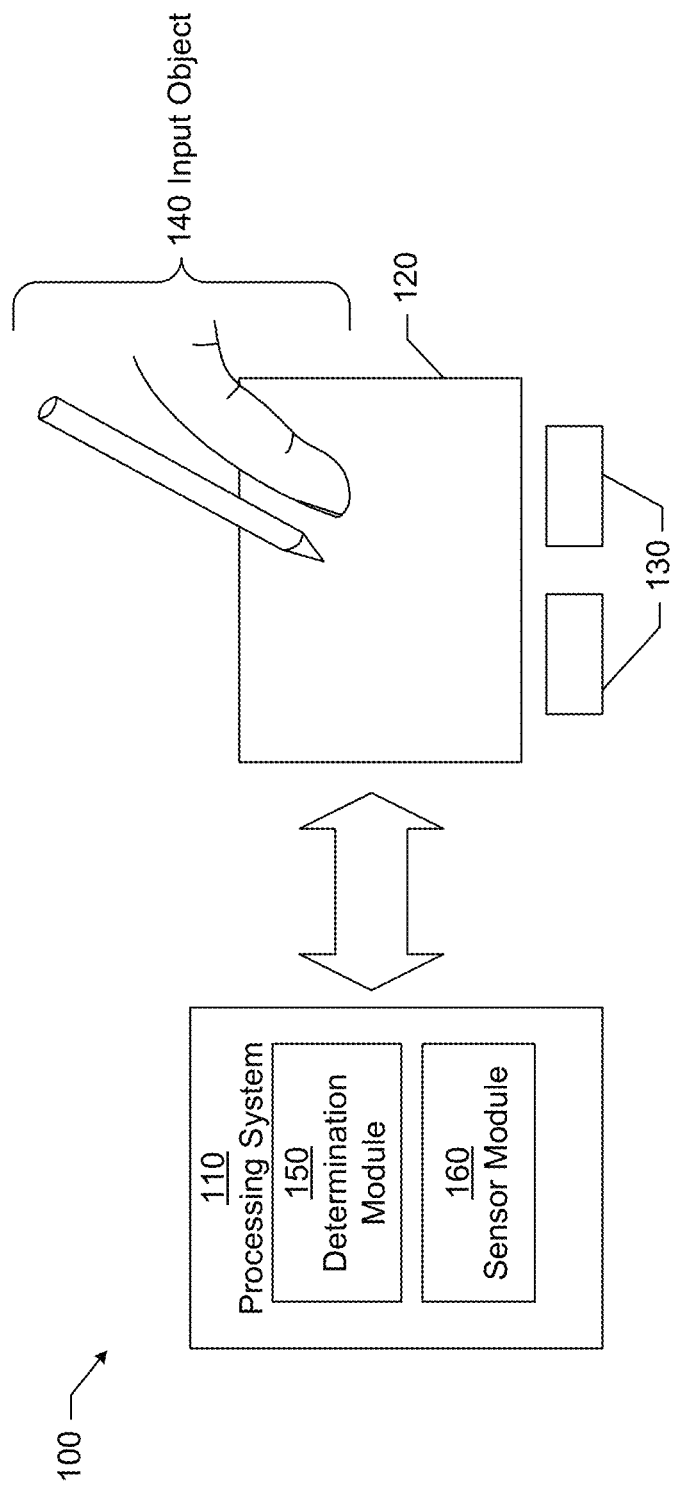
FIG. 1 shows a schematic diagram of a system in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, the particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurement values acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurement values acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

One or more embodiments are directed to at least one of the input objects (140) being a pen with an inductor in the sensing region. In one or more embodiments, the pen is a passive pen, or a pen that is not required to store energy for an extended period of time. For example, the amount of energy may be for one sensing cycle, such as the sensing cycle shown in FIG. 5. Continuing with FIG. 1, a passive pen is type of input object that is used on capacitive sensing devices. In some embodiments, a passive pen may receive power only from the sensing signals driven on sensor electrodes which interact with the passive pen. The passive pen interacts with a capacitive sensing device by affecting the measured capacitance of the sensing device. In other words, a passive pen interacts with the input device in a way similar to how a finger interacts with the input device. In contrast to an active pen that sends an electrical signal to an input device using an internal power source, a passive pen does not utilize active components to transmit a signal to the sensing device. Rather, the only input to the capacitive sensing device is based on the detection, by the capacitive sensing device, of the passive pen. Therefore, in contrast to an active pen, a passive pen does not typically include a battery or other power source. A passive pen may also be referred to as a passive stylus.

In one or more embodiments of the invention, a passive pen does not include electrical components to interact with the input device. Thus, while the passive pen may include electrical components only for decorative aspects, such as to include a light, the passive pen exclusively interacts with the input device using mechanical components. By way of another example, the passive pen may have electrical components, but may not be configured to actively transmit packets of information via a single particular frequency. In other words, any transmission of information is based on changing of the resonance frequency, which may be adjusted by electrical components. In such embodiments, the electrical components may be exclusively for changing the resonance frequency and, optionally, decorative aspects. In other embodiments, the passive pen excludes all electrical components. While embodiments of the disclosed invention are primarily described for use with a passive pen, semi-passive pens that are charged by the sensing region and transmit using the charge and active pens may also be utilized.

Figure 2:
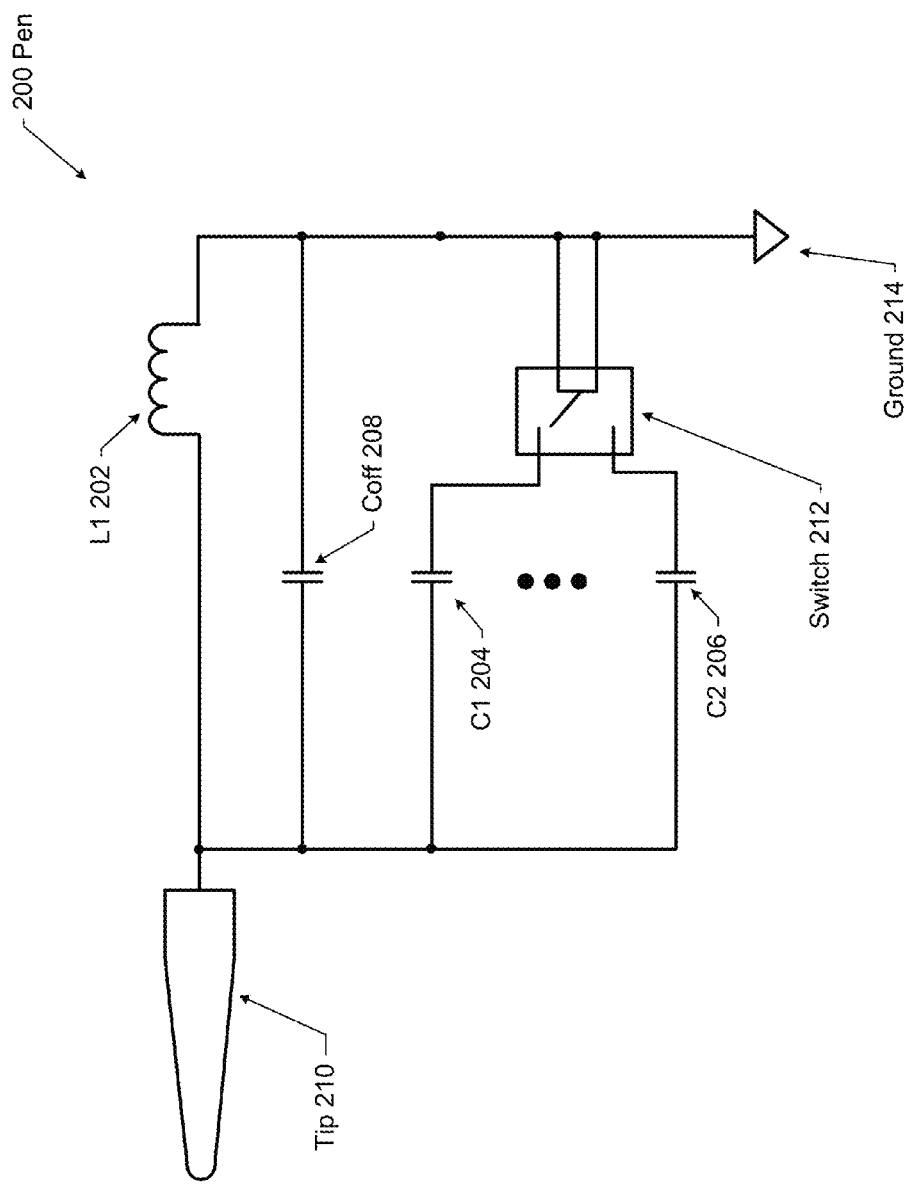
FIG. 2 shows a schematic diagram of a passive pen in accordance with one or more embodiments of the invention.

FIG. 2 shows an example circuit diagram of a pen (200) configured to resonate in multiple different frequencies in accordance with one or more embodiments of the invention. As shown in FIG. 2, the pen includes an inductor (202). The pen (200) may also have various capacitors (e.g., C1 (204), C2 (206)) and trim capacitor Coff (208). Each capacitor (e.g., C1 (204), C2 (206)) may have different levels of capacitance. Although not shown, the pen may have parasitic resistance and parasitic capacitance. The parasitic resistance and parasitic capacitance may have various degrees of magnitude and may be accommodated during the tuning procedure. The trim capacitor Coff (208) may be adjusted to compensate for the parasitic capacitance. A capacitance (not shown) may also exist between the input device (shown in FIG. 1) and the pen.

In one or more embodiments of the invention, the pen includes functionality to resonate at multiple different and selectable frequencies. Each of the multiple different frequencies may be substantially the same frequency as one of the possible driving waveforms of the sensor electrodes of the input device. In other words, the sensor electrodes coupled to the processing system (110) are driven with sensing signals at defined frequencies. The pen is configured to have resonance frequencies that are substantially the same as the defined frequencies of the sensing signals. In other words, each resonance frequency is within a threshold distance of a defined frequency of the sensing signals. Thus, the effects of the pen in the sensing region are amplified when the pen has the substantially the same resonance frequency.

Continuing with FIG. 2, the pen (200) includes a tip (210) and a switch (212). The tip (210) is the portion of the pen that may contact the sensing region. In other words, through the tip (210), the measured capacitance of the sensing region may change. The switch (212) is any type of switch that is configured to connect one or more capacitors (e.g., C1 (204), C2 (206)) in parallel with the inductor (202). Because the switch (212) connects the capacitor in parallel with the inductor and the capacitors have different levels of capacitance, the selection of a particular capacitor changes the resonance frequency of the pen in accordance with one or more embodiments of the invention. The switch (212) may be a mechanical switch, an electrical switch, or an electrical mechanical switch. The switch (212) may include functionality to maintain a switch state to keep the pen in the selected resonance frequency. In other embodiments, the switch is configured to change the resonance frequency temporarily and then immediately change back to a default state. Example of switches that may be used include rotary, latching, slides, counters, application specific integrated circuits with transistors that can select the capacitor, one or more buttons, or any other type of switch.

As shown, the tip (210) is connected to the selected capacitor and the inductor (202) to cause the tip to have a resonating frequency and be in a resonating state. In other words, the resonating state is when the pen resonates at a selected frequency, and the tip is connected to circuit having the inductor in parallel with the capacitor. In the non-resonating state, the tip (210) does not resonate and is connected to the ground (214). In other words, in the resonating state, the inductor (202) is part of the circuit and causes the system to resonate. Under non-resonating conditions, the inductor is equivalent to a low-value resistor, effectively a dead short path to ground. Various mechanical elements may be used to switch the pen between the non-resonating state and the resonating state. In other embodiments, the pen may switch to a non-resonating state by altering the resonant frequency of the pen so that it is no longer substantially the same as the frequency of any of the sensing signals.

Although FIG. 2 shows a certain configuration of components, other configurations may be used without departing from the scope of the invention. For example, multiple inductors and/or switches may be present. Further, the same or a different switch may be present that may be configured to connect the tip to the ground in a manner that effectively removes the inductor from the circuit, and changes the pen to a non-resonating state.

Returning to FIG. 1, the processing system may further include functionality to identify a finger or other non-resonating object, and a portion of a hand, such as a palm. The processing system may include functionality to report the non-resonating object even when the pen is resonating and in the sensing region. The processing system may include functionality to suppress reporting portions of the hand or other large input objects.

In one or more embodiments of the invention, the performance by the processing system may be partitioned into frames. Each frame represents a length of time to perform a single capture the state of the sensing region with respect to the existence of one or more input objects. The length of time may vary among frames. For example, if no input object is detected, the length of time may be shorter then when an input object is detected and additional processing is performed. In one or more embodiments of the invention, at the end of the frame, a report may be transmitted to other components of the processing system, input device, host system, or other device, or combination thereof. Each report includes positional information and frequency information regarding any input objects in the sensing region.

Figure 3:
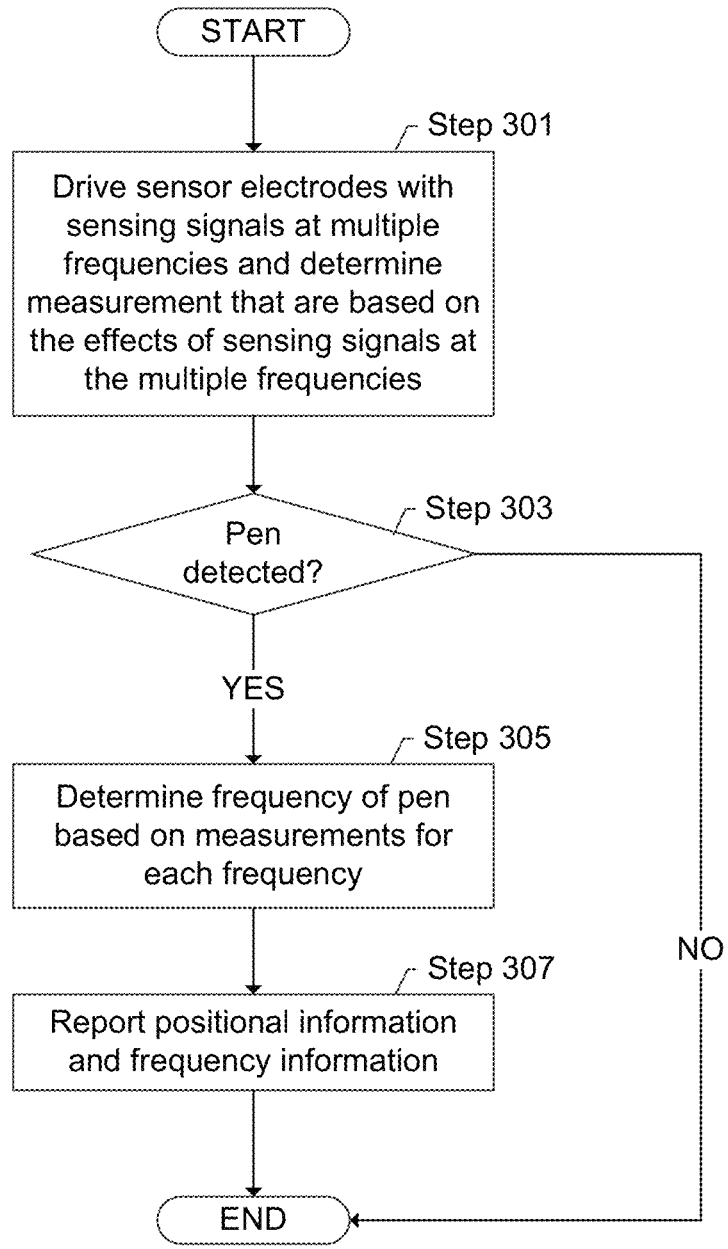
FIG. 3 shows a flowchart in accordance with one or more embodiments of the invention.

FIG. 3 shows a flowchart in accordance with one or more embodiments of the invention. FIG. 3 may be performed, for example, by the processing system using the determination module and sensor module shown in FIG. 1 in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 301, the sensor electrodes are driven with sensing signals at multiple frequencies and measurement values are determined based on the effects of the sensing signals at the multiple frequencies. When the pen is in the sensing region, the set of measurement values are based on effects of the pen in the sensing region and the sensing signals at the various frequencies. In one or more embodiments of the invention, mutual capacitance sensing is performed and the set of measurement values are the measured difference between received sensing signals and the transmitted sensing signals. Additionally or alternatively, absolute capacitive sensing may be performed and the measurement values measure the effects of the pen in the sensing region when sensing signals are transmitted at the selected frequency.

In one or more embodiments, transmitting sensing signals at multiple frequencies corresponds to each sensor electrode that transmits sensing signals, transmits substantially at each of the multiple possible resonance frequencies of the pen. In other words, each single sensor electrode that transmits, transmits at each of the multiple possible resonance frequencies at different times, thereby being distinct from frequency division multiplexing. However, frequency division multiplexing may be performed in conjunction with one or more embodiments without departing from the scope of the invention. The times may be interleaved for a single frame, performed in a round robin fashion, or performed in another manner.

For the following examples, consider the scenario in which the pen is configured to resonate frequencies F1, F2, and F3. In an example, for a particular frame, the sensor electrodes are driven with sensing signals at frequency F1 and measurement values acquired, then driven with sensing signals at frequency F2 and measurement values acquired, and then driven with sensing signals at frequency F3 and measurement values acquired. By way of another example, the driving of the sensor electrodes at the different frequencies may be interleaved during a single frame. In other words, during a single frame, one or more sensor electrodes may be driven at frequency F1, then F2, then F3, then F1, then F2, then F3, and so forth. By way of a more concrete example, consider the following. Sensing at a particular frequency may be partitioned into sensing cycles. Groups of consecutive sensing cycles may be combined into bursts. Bursts on different frequencies may be interleaved. For mutual capacitance sensing, the interleaving may be according to transmitter electrodes. In such a scenario, each transmitter electrode may transmit a burst at each of multiple frequencies before moving to the next transmitter electrode. Other example techniques may be performed to interleave the transmission at multiple frequencies without departing from the scope of the invention.

Continuing with FIG. 3, in Step 303, a determination is made whether a pen is detected. In one or more embodiments of the invention, detecting a pen may be performed using techniques known in the art. For example, the measurement values may be adjusted for a baseline and have other preprocessing performed. A determination may be made whether the resulting measurement values have values that comply with a threshold level for indicating the presence of a pen. If the resulting measurement values comply with a threshold and the size is indicative of a pen, then a pen is detected in the sensing region and the flow proceeds to Step 305 in accordance with one or more embodiments of the invention. Otherwise, the flow may proceed to end in some embodiments of the invention.

Although FIG. 3 shows driving sensor electrodes at multiple frequencies and then determining whether the pen is in the sensing region, a determination may be made whether the pen is in the sensing region while the sensor electrodes are driven. For example, the sensor electrodes may be driven with a single frequency or a strict subset of the frequencies, and a determination may be made whether the pen is in the sensing region before driving the sensor electrodes with all available frequencies. Determining whether the pen is in the sensing region may be performed by obtaining a delta baseline image to identify an input object that may potentially resonate. The input object may be determined to potentially resonate when the input object satisfies a size threshold. If the size threshold is a maximum value, such as the maximum size of a tip of a pen, then the input object satisfies the size threshold when the input object is less than the size threshold. If the pen is not determined to be in the sensing region, the flow may proceed to end without driving the sensor electrodes with the remaining possible resonance frequencies. This can save sensing cycles when no input object is detected that fits within an expected range of sizes for a pen. When the flow proceeds to end, normal processing may be performed to identify positional information for any detected input objects. If the pen, or potential pen, is determined to be in the sensing region, then the sensor electrodes are driven with the remaining possible resonance frequency(s). In at least some embodiments, if the pen is determined to be in the sensing region, then the location of the pen is identified prior to driving the sensor electrodes with the remaining resonance frequency(s). Further, only the sensor electrodes that correspond to the identified location are driven with sensing signals at the remaining frequencies for the current frame. Other frames of sensing may have different identified locations of the pen, and, thus, different sensor electrodes that transmit at each of the multiple frequencies.

Continuing with FIG. 3, in Step 305, the frequency of the pen is determined based on the measurement values for each frequency in accordance with one or more embodiments of the invention. In one or more embodiments of the invention, determining the frequency of the pen may be based on criterion. For example, in one or more embodiments of the invention, the criterion may be a pre-defined threshold for a peak magnitude of the measurement values at a particular frequency. In such embodiments, determining whether the measurement values satisfy a criterion includes identifying the peak magnitude and determining whether the peak magnitude is greater than the pre-defined threshold. In some embodiments, exceeding a threshold signal level indicates that the frequency of the driven sensing signals is substantially similar to the current resonant frequency of a pen in the sensing region.

By way of another example, the criterion may be based on a difference between measurement values at different frequencies. For example, a measurement value may be obtained for a first frequency and subtracted from the corresponding measurement value for a different frequency. If the difference for at least one measurement value exceeds a difference threshold, then the resonance frequency may be determined based on which measurement value is atypical from other measurement values.

By way of another example, measurement values for each particular frequency may be combined into a signal response level for the particular frequency. For example, the combination may be an average or other function. The combined measurement values may be across all measurement values or the measurement values only corresponding to the location of the detected input object. The signal response levels for different frequencies may be compared to identify the resonance frequency. In one or more embodiments, the signal response level for the resonance frequency may be suppressed whereas the other signal response levels are positive. In other words, the signal response level for the resonance frequency may be negative, measurably below the non-resonating level, or otherwise suppressed. In other embodiments, the signal response level for the resonance frequency may be an elevated level, whereas the other signal response levels are approximately equal. In such embodiments, a difference may be performed between each pair of signal response levels and a determination may be made whether the difference satisfies a threshold. If the difference satisfies the threshold, then the frequency corresponding to the elevated signal response level is determined to be the resonance frequency of the pen.

In accordance with one or more embodiments of the invention, the criterion may be matching a pattern of the measurement values in accordance with one or more embodiments of the invention. In one or more embodiments of the invention, when the pen is present in the sensing region, the selected frequency is near the resonance frequency, and mutual capacitance sensing is used, the measurement values may have a peak measurement and one or more tails extending from the peak measurement. A tail is a line of elevated or increased measurement values that extend from the position of the peak measurement and have progressively lower values from the peak measurement. When the pen is perpendicular to the surface of the input device, four tails may result from the sensing signals at the resonance frequency of the pen. When the pen is at an angle, the tail may be in the opposite direction of the heading direction of the pen. Thus, determining whether the measurement values satisfy the criterion may be performed by determining whether the relative magnitude of the measurement values with respect to each other satisfy a pattern having tails.

Other criteria may be used without departing from the scope of the invention. In one or more embodiments, the pen may be in a non-resonating state. If the pen is in a non-resonating state, the criterion for determining the resonating state of the pen is not satisfied. Thus, the pen is detected as being in the non-resonating state.

In Step 307, positional information and frequency information is reported in accordance with one or more embodiments of the invention. In one or more embodiments, the positional information may be reported to the host. The frequency information reported may include the resonating state or non-resonating state of the pen. The frequency information may include information about the resonating frequency. For example, an identifier of the resonating frequency may be added to the frequency information. The identifier may be a frequency identifier in which the host may identify the frequency or an identifier of a switch state of the pen. For example, the identifier may be 1, 2, 3, or 4 if the pen has three resonating states and one non-resonating state. Other identifiers may be included without departing from the scope of the invention.

By being able to detect on multiple frequencies, the user may communicate additional information to the host via the pen, which is only detected by the input device rather than actively transmitted. For example, if the user is using a drawing application, the user may switch between different colors by changing the resonance frequency of the pen and having the input device detect the change. The host or application on the host may be configured to associate the identifier of the resonance frequency with the resulting action, such as the change in color. By way of other examples, the change in the resonance frequency may be used to request a display of a context menu, a change in active software application, select graphical user interface widgets versus move a cursor, or perform other actions.

In one or more embodiments, the delta baseline image may optionally be performed prior to acquiring measurement values for the second frequency, and after a determination is made that an input object which potentially resonates is present. For example, the input object may be determined potentially resonate when the input object satisfies a size threshold.

The sensing on multiple frequencies may be performed without using a baseline. For sensing non-resonating objects, a raw image may be assembled for each row, where each measurement value is a sum of the measurement values across the transmitted frequencies. For sensing resonating objects, a delta frequency image is generated for two frequencies, whereby each measurement value, or signal response level, in one frequency is subtracted from the corresponding measurement value, or signal response level, in another frequency. In other words, for each location, the measurement value for a first frequency at the location is subtracted from the measurement value for the second frequency at the location in order to generate a delta frequency image. Since a raw difference is taken, no baseline may be required as the noise is at least substantially the same regardless of frequency and only resonating objects exhibit a difference between different frequencies. Whenever the delta frequency image shows an input object, the delta image for frequency is used for additional processing to obtain positional information and frequency information for the resonating objects. Because non-resonating objects will not be in the delta image, the non-resonating objects are suppressed. Thus, one or more embodiments may, without a baseline and without considering size of objects, suppress a palm or other portion of the hand that is not resonating while at the same time correctly reporting the resonating pen.

In some embodiments, both the delta frequency image and a delta baseline image are used. A delta baseline image is an image of the sensing region in which the baseline values in a current baseline are subtracted from the measurement values. The delta baseline image may be used to detect the presence of a finger or other non-resonating input object as well as a possible resonating input object. In order to distinguish a finger from a portion of a hand, various techniques may be performed. For example, a maximum size threshold may be applied to input objects detected in the delta baseline image in order to suppress large input objects such as portions of the hand, and keep finger tips. The delta frequency image may then be used to identify the resonating frequency of any detected pen in the sensing region. If only a portion of a hand is detected that is not a finger, in order to continue suppression of the portion of a hand even when the resonating pen is removed, the processing system may lock to the delta frequency image until both a delta baseline image and the delta frequency image show no object is present.

In some embodiments, a peak ratio may be used to determine whether an input object is present. The following is an example algorithm to use a peak ratio. In Step 1, a raw image is obtained at a first frequency and a delta baseline image is computed for the raw image. In Step 2, the delta baseline image is processed to obtain positional information and positional information for any input objects are reported to the host. In Step 3, if no input objects are detected in the delta baseline image that may be resonating pens, then the flow may proceed to Step 1. If an input object is detected that may be a resonating pen, then the row having the input object is detected. The sensor electrode corresponding to the row transmits transmitter signals at a resonating frequency and the delta image for the row is identified. In Step 6, RES[ . . . ] is set equal to the delta image for the row at the resonator frequency, and 2DR[ . . . ] is set equal to the delta baseline image for the row. In Step 7, the maximal value in RES[ . . . ] and 2DR[ . . . ] are identified. The maximal value should be at approximate the same location. In Step 8, a peak ratio is determined by dividing the maximal value in RES[ . . . ] by the maximal value in 2DR[ . . . ]. In Step 9, if the peak ratio is greater than a threshold (e.g., 2.0), then the processing system may report that a first button on the pen is pressed. In Step 10, if the peak ratio is less than the same or different threshold (e.g., 0.0), then the processing system may report that a second button on the pen is pressed. The processing system may then proceed to process the next frame.

The above are only a few embodiments describing how processing on multiple frequencies may be performed. The above embodiments may be combined and/or modified in virtually any manner to generate additional embodiments that are within the scope of the invention. For example, if a delta baseline image is used, the delta frequency image may be obtained for only the portion of the image in which a pen is detected.

Figure 4:
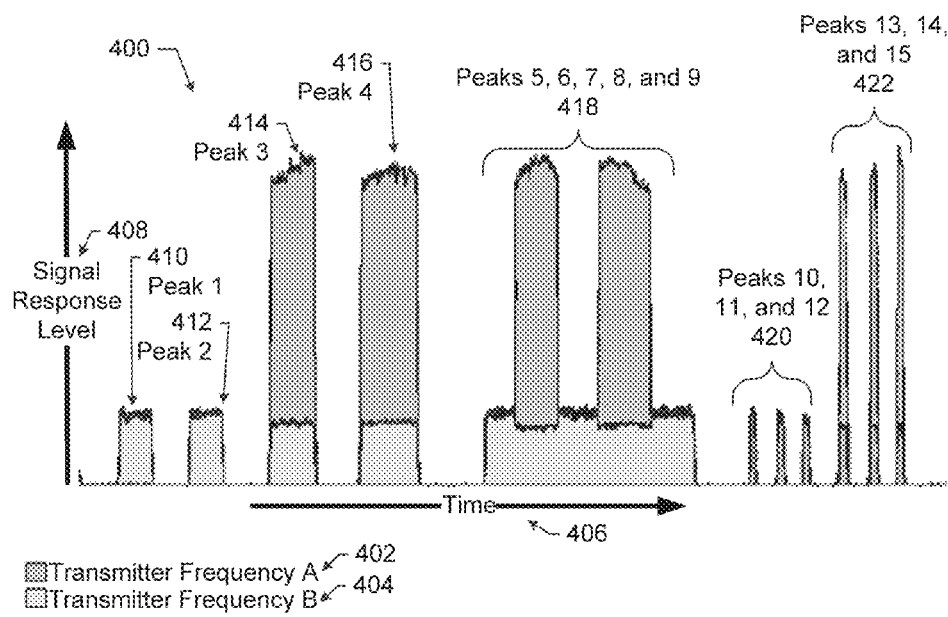
FIG. 4 shows an example graph in accordance with one or more embodiments of the invention.

FIG. 4 shows an example graph (400) from detecting a resonating pen with multiple transmitter frequencies in accordance with one or more embodiments of the invention. In this example, sensing frames are detected at Transmitter Frequency A (frequency A) (402) and Transmitter Frequency B (frequency B) (404). The horizontal axis (406) shows time, namely different sensing frames. The vertical axis (408) shows the signal response level obtained by performing an aggregation on the delta baseline image. Peak 1 (410) and peak 2 (412) correspond to long taps of a pen in the sensing region with the pen in a non-resonating state. As shown the signal response level for frequency A and frequency B are substantially the same. Peak 3 (414) and peak 4 (416) correspond to long taps of the pen in the sensing region with the pen in a resonating state that resonates in frequency A. Thus, the signal response levels for peak 3 (414) and peak 4 (416) is substantially greater for frequency A than for frequency B. Peaks 5, 6, 7, 8, and 9 (418) correspond to the pen entering the sensing region in non-resonating state, then resonating in frequency A, then non-resonating, then resonating in frequency A, then non-resonating, all while in the sensing region. For example, a button may be selected to cause the pen to resonate in frequency A, and peaks 5, 6, 7, 8, and 9 (418) may correspond to two selections and de-selections of the button while the pen is in the sensing region. Peaks 10, 11, and 12 (420) correspond to fast taps of the pen in the sensing region while the pen is in a non-resonating state. Peaks 13, 14, and 15 (422) correspond to fast taps of the pen in the sensing region while the pen is in a resonating state resonating at frequency A.

As shown in the example, the input device may detect the location of the pen based on the elevated signal response level as compared to the floor, as well as detect whether and which frequency the pen is resonating at based on the difference between the signal response levels for different transmitter frequencies.

Using a resonating pen with a resonant frequency lower than the normal touch sensing frequency may be useful for several reasons. For example, a narrow body pen, if desired, may be difficult to produce at a higher resonant frequency. No temporal analysis is needed if multiple frequencies for detection, one resonating and one not, are used by the host device. A button press while out of the sensing region may be easier to detect once the pen returns to the sensing region.

Figure 5:
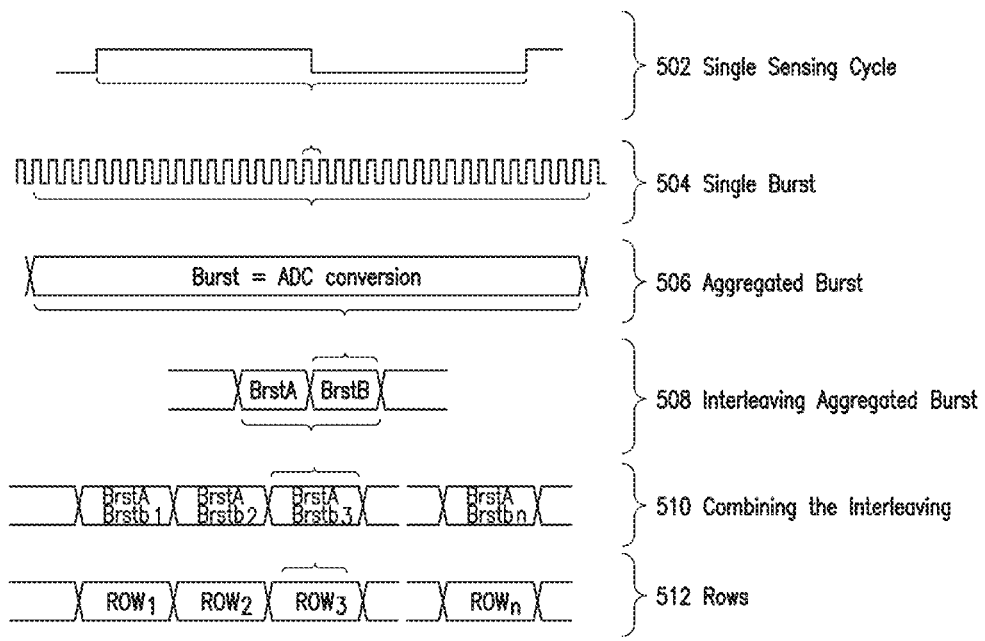
FIG. 5 shows an example diagram in accordance with one or more embodiments of the invention.

FIG. 5 shows an example processing for eliminating a baseline in accordance with one or more embodiments of the invention. In the example in FIG. 5, a resonating pen is being detected at two sensing frequencies (e.g., Frequency A and Frequency B). As shown in FIG. 5, multiple sensing cycles (502) for a particular frequency are combined into a single burst for the frequency. By way of an example, between 20 to 100 sensing cycles may be combined into the burst for the frequency. The measurement values for the burst for the frequency are aggregated in order to obtain an aggregated burst value (506). For example, the aggregation may be a summation, an average, or other aggregation. The measurement and aggregation for the burst on a particular frequency may be temporally interleaved with acquiring measurements and aggregating bursts for another frequency as shown in 508. The interleaving may be combined (510) into values for each row (512) of the sensing region. In the combining, a delta frequency image may be acquired to obtain an aggregate value for the row (512) in some embodiments. In some embodiments, by interleaving transmitting at frequency A and frequency B within the cluster, artifacts from fast moving fingers or landing\lifting events are minimized.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system comprising:
   a sensor module coupled to a plurality of sensor electrodes, the sensor module configured to:
      drive the plurality of sensor electrodes with first sensing signals at a strict subset of a plurality of frequencies, and
      drive the plurality of sensor electrodes with second sensing signals at a remaining subset of the plurality of frequencies; and
   a determination module configured to:
      obtain, concurrently with the driving of the plurality of sensor electrodes with the first sensing signals, a first plurality of measurement values that are based on effects of the first sensing signals,
      identify, from the first plurality of measurement values, a first input object in a sensing region that is less than a first size threshold indicating possible resonance of the first input object,
      obtain, concurrently with the driving of the plurality of sensor electrodes with the second sensing signals, a second plurality of measurement values that are based on effects of the second sensing signals, and a resonance of a pen in the sensing region,
         wherein the first input object is the pen, wherein the plurality of sensor electrodes are driven with the second sensing signals at the remaining subset in response to identifying the first input object in the sensing region that is less than the first size threshold,
      determine a delta frequency image between the first plurality of measurement values and the second plurality of measurements values, wherein the delta frequency image comprises, for each location of a plurality of locations, a difference between a first measurement value in the first plurality of measurement values and a second measurement value in the second plurality of measurement values, the first measurement value and the second measurement value corresponding to the location,
      determine a resonating state of the pen based on the first plurality of measurement values and the second plurality of measurement values,
      determine positional information for the pen in the resonating state from the delta frequency image, wherein the delta frequency image suppresses noise and a second input object that is present in the sensing region and is in a non-resonating state, and
      report the resonating state of the pen.

2. The processing system of claim 1, wherein the determination module is further configured to:
   determine a first signal response level of the first plurality of measurement values, and
   determine a second signal response level of the second plurality of measurement values,
   wherein determining the resonating state is based on the comparing the first signal response level with the second signal response level.

3. The processing system of claim 2, wherein the first signal response level is suppressed.

4. The processing system of claim 2, wherein the first signal response level is an elevated level.

5. The processing system of claim 2, wherein the determination module is further configured to:
   determine a difference between the first signal response level and the second signal response level,
   wherein the resonating state is determined based on the difference being greater than a detection threshold.

6. The processing system of claim 1, wherein the pen is reported to the host and the second input object is not reported to the host.

7. The processing system of claim 1, wherein the second input object is at least a portion of a hand.

8. The processing system of claim 1, further comprising:
   determining a delta baseline image between the first plurality of measurement values and a baseline;
   detecting the second input object in the sensing region using the delta baseline image;
   determining that the second input object satisfies a second size threshold using the delta baseline image,
   wherein the pen and the second input object are reported to the host based on the pen being in the resonating state and the second input object satisfying the second size threshold.

9. A method for sensing input objects, comprising:
   driving a plurality of sensor electrodes with first sensing signals at a strict subset of a plurality of frequencies;
   obtaining, concurrently with the driving of the plurality of sensor electrodes with the first sensing signals, a first plurality of measurement values that are based on effects of the first sensing signals;
   identifying, from the first plurality of measurement values, a first input object in a sensing region that is less than a first size threshold indicating possible resonance of the first input object;
   driving the plurality of sensor electrodes with second sensing signals at a remaining subset of the plurality of frequencies, wherein the plurality of sensor electrodes are driven with the second sensing signals at the remaining subset in response to identifying the first input object in the sensing region that is less than the first size threshold;
   obtaining, concurrently with the driving of the plurality of sensor electrodes with the second sensing signals, a second plurality of measurement values that are based on effects of the second sensing signals, and a resonance of a pen in the sensing region, wherein the first input object is the pen;
   determining a delta frequency image between the first plurality of measurement values and the second plurality of measurement values, wherein the delta frequency image comprises, for each location of a plurality of locations, a difference between a first measurement value in the first plurality of measurement values and a second measurement value in the second plurality of measurement values, the first measurement value and the second measurement value corresponding to the location;

determining a resonating state of the pen based on the first plurality of measurement values and the second plurality of measurement values;

determining positional information for the pen in the resonating state from the delta frequency image, wherein the delta frequency image suppresses noise and a second input object that is present in the sensing region and is in a non-resonating state; and reporting the resonating state of the pen.

10. The method of claim 9, further comprising:
determining a first signal response level of the first plurality of measurement values, and
determining a second signal response level of the second plurality of measurement values,
wherein determining the resonating state is based on the comparing the first signal response level with the second signal response level.

11. The method of claim 10, further comprising:
determining a difference between the first signal response level and the second signal response level,
wherein the resonating state is determined based on the difference being greater than a detection threshold.

12. The method of claim 9, further comprising:
determining a delta baseline image between the first plurality of measurement values and a baseline;
detecting the second input object in the sensing region using the delta baseline image;
determining that the second input object satisfies a second size threshold using the delta baseline image,
wherein the pen and the second input object are reported to the host based on the pen being in the resonating state and the second input object satisfying the second size threshold.

13. An input device comprising:
a plurality of sensor electrodes configured to generate sensing signals; and
a processing system connected to the plurality of sensor electrodes and configured to:

drive the plurality of sensor electrodes with first sensing signals at a strict subset of a plurality of frequencies, obtain, concurrently with the driving of the plurality of sensor electrodes with the first sensing signals, a first plurality of measurement values that are based on effects of the first sensing signals;

identify, from the first plurality of measurement values, a first input object in a sensing region that is less than a first size threshold indicating possible resonance of the first input object;

drive the plurality of sensor electrodes with second sensing signals at a remaining subset of the plurality of frequencies, wherein the plurality of sensor electrodes are driven with the second sensing signals at the remaining subset in response to identifying the first input object in the sensing region that is less than the first size threshold, obtain, concurrently with the driving of the plurality of sensor electrodes with the second sensing signals, a second plurality of measurement values that are based on effects of the second sensing signals, and a resonance of a pen in the sensing region, wherein the first input object is the pen, determine a delta frequency image between the first plurality of measurement values and the second plurality of measurement values, wherein the delta frequency image comprises, for each location of a plurality of locations, a difference between a first measurement value in the first plurality of measurement values and a second measurement value in the second plurality of measurement values, the first measurement value and the second measurement value corresponding to the location;

determine a resonating state of the pen based on the first plurality of measurement values and the second plurality of measurement values, determine positional information for the pen in the resonating state from the delta frequency image, wherein the delta frequency image suppresses noise and a second input object that is present in the sensing region and is in a non-resonating state, and report the resonating state of the pen.

* * * * *